US008441353B2

(12) United States Patent
Williams, Sr. et al.

(10) Patent No.: US 8,441,353 B2
(45) Date of Patent: May 14, 2013

(54) METHODS, SYSTEMS AND ARTICLES OF MANUFACTURE FOR MONITORING SUBJECTS WITHIN A FACILITY

(75) Inventors: Clinton Eugene Williams, Sr., Winterville, NC (US); Gary G. Leonhardt, Macclesfield, NC (US); Mark R. Cervi, Greenville, NC (US); Joseph L. Whaley, Winterville, NC (US)

(73) Assignee: Guardtracker Innovations, LLC., Winterville, NC (US)

( * ) Notice: Subject to any disclaimer, the term of this patent is extended or adjusted under 35 U.S.C. 154(b) by 453 days.

(21) Appl. No.: 12/751,409

(22) Filed: Mar. 31, 2010

(65) Prior Publication Data
US 2010/0253521 A1 Oct. 7, 2010

Related U.S. Application Data

(60) Provisional application No. 61/166,377, filed on Apr. 3, 2009.

(51) Int. Cl.
*G08B 13/14* (2006.01)
(52) U.S. Cl.
USPC ............. 340/572.1; 340/825.49; 340/539.1
(58) Field of Classification Search .... 340/572.1–572.9, 340/825.49, 539.1, 539.28, 531, 901, 905, 340/539
See application file for complete search history.

(56) References Cited

U.S. PATENT DOCUMENTS

| 5,473,831 | A * | 12/1995 | Locke ............................ 40/490 |
| 5,537,126 | A * | 7/1996 | Kayser et al. ................. 345/2.1 |
| 7,233,781 | B2 * | 6/2007 | Hunter et al. .............. 455/404.1 |
| 2004/0000997 | A1 * | 1/2004 | Stevens, III ............... 340/572.1 |
| 2004/0100361 | A1 * | 5/2004 | Brackett et al. ............. 340/5.74 |
| 2008/0117022 | A1 * | 5/2008 | Polozola ..................... 340/10.1 |
| 2008/0217400 | A1 * | 9/2008 | Portano ....................... 235/380 |

* cited by examiner

*Primary Examiner* — Daniel Previl
(74) *Attorney, Agent, or Firm* — Myers Bigel Sibley & Sajovec, P.A.

(57) ABSTRACT

A monitoring system includes a plurality of display devices located throughout a facility, and a data server in communication with the display devices. Each subject within the facility has an information tag attached thereto that contains subject identification information. A plurality of information tag readers in communication with the data server are located throughout the facility. Each information tag reader is configured to activate and read subject identification information from an information tag of a subject who comes within a predetermined distance of the reader. If the reader is located near a display device, the data server displays subject information for the identified subject on the display device. Displayed subject information includes identification information for of a subject and one or more coded icons adjacent to the identification information, wherein each coded icon provides information about a respective subject attribute.

54 Claims, 15 Drawing Sheets

GUARD TRACKER - COUNTY DETENTION CENTER

SYSTEM SETTINGS

| NAME | SET | VALUE | ACTIVE | REQUIRED | SYS |
|---|---|---|---|---|---|
| ACTIVECONSTSET | ALL | DEV | ☑ | ☑ | ☑ |
| ACTIVELINKEDDBTYPE | ALL | ACCESS | ☑ | ☑ | ☑ |
| ACTIVEMODE | ALL | DEV | ☑ | ☑ | ☑ |
| ACTIVEVERSIONCODE | ALL | 08.10.00.00 | ☑ | ☑ | ☑ |
| ACTIVEVERSIONDATA | ALL | 08.10.00.00 | ☑ | ☑ | ☑ |
| ALLOWLIVECYCLEVALUPDATES | DEV | TRUE | ☑ | ☑ | ☑ |
| ALLOWLIVECYCLEVALUPDATES | LIVE | FALSE | ☑ | ☑ | ☑ |
| APPNAME | ALL | GUARDTRACKER | ☑ | ☑ | ☑ |
| CYCLEAPPTIMERINTERVAL | LIVE | 10000 | ☑ | ☑ | ☑ |
| CYCLEAPPTIMERINTERVAL | DEV | 15000 | ☑ | ☑ | ☑ |
| CYCLESDATAIMPORTPISTOL | DEV | 8 | ☑ | ☑ | ☑ |
| CYCLESDATAIMPORTPISTOL | LIVE | 30000 | ☑ | ☑ | ☑ |
| CYCLESDATAREFRESHSCREEN | DEV | 60000 | ☑ | ☑ | ☑ |

RECORD ⏮ 1 OF 61 ▶ ⏭   ☒ NO FILTER   SEARCH

FIG. 3C

GUARD TRACKER - COUNTY DETENTION CENTER

COLOR SETTINGS

| | PURPOSE | DESC | BLACKFONT | RED | GRN | BLUE | RGBCOLOR | SEQ | REQUIRED | SYS |
|---|---|---|---|---|---|---|---|---|---|---|
| ✎ | FLAG1 | PURPLE | ☑ | 140 | 50 | 145 | 9515660 | 1 | ☑ | ☑ |
| | FLAG2 | RED | ☑ | 222 | 55 | 0 | 14302 | 2 | ☑ | ☑ |
| | FLAG3 | YELLOW | ☑ | 255 | 255 | 0 | 65535 | 3 | ☑ | ☑ |
| | FLAG4 | GREEN LIGHT | ☑ | 70 | 155 | 30 | 2005830 | 4 | ☑ | ☑ |
| | FLAG5 | BLUE | ☑ | 0 | 90 | 255 | 16734720 | 5 | ☑ | ☑ |
| | FLAG6 | PINK | ☑ | 255 | 110 | 245 | 16084735 | 6 | ☑ | ☑ |
| | PICBACKGROUND | GRAY | ☑ | 195 | 195 | 195 | 12829635 | 999 | ☑ | ☑ |
| | STATUS1 | RED | ☐ | 255 | 80 | 0 | 20735 | 1 | ☑ | ☑ |
| | STATUS2 | YELLOW | ☑ | 255 | 255 | 0 | 65535 | 2 | ☑ | ☑ |
| | STATUS3 | GREEN LIGHT | ☑ | 0 | 255 | 0 | 65280 | 3 | ☑ | ☑ |
| | STATUS4 | YELLOW | ☑ | 255 | 255 | 0 | 65535 | 4 | ☑ | ☑ |

INCREMENT BY: 10

RECORD ◁ 1 OF 29 ▷ ▷| ☒ NO FILTER | SEARCH

GUARD TRACKER - COUNTY DETENTION CENTER
ASSIGN FLAGS

[A-4] [07] ADUBOIS, JBILLY H JR
21BM  010187  508-210 I

| | FLAG TYPE (ROW AND DESCRIPTION) | FLAG (COLUMN AND DESCRIPTION) | ICON |
|---|---|---|---|
| ☑ | 1 BEHAVIOR RISK | 2 EXTREMELY DANGEROUS (XD) | PURPLE HEXAGON |
| ☑ | 1 BEHAVIOR RISK | 9 ADMIN. LOCK DOWN (LD) | PURPLE HEXAGON |
| ☑ | 2 MEDICAL PROBLEM | 2 CONTAGION RISK (IE MRSA) (M2) | RED HEART |
| ☑ | 3 MENTAL ILLNESS | 2 PSYCHOTIC (PS) | YELLOW STAR |
| ☑ | 4 SPECIAL DIET | 3 LOW SALT (LS) | GREEN TRIANGLE |
| ☑ | 5 MEDICATIONS DUE | 2 TID (TID) | BLUE SQUARE |
| ☐ | 1 BEHAVIOR RISK | 1 SUICIDAL (SU) | PURPLE HEXAGON |
| ☐ | 1 BEHAVIOR RISK | 3 VIOLENT /ASSAULTIVE (VA) | PURPLE HEXAGON |
| ☐ | 1 BEHAVIOR RISK | 4 SEIZURES (SZ) | PURPLE HEXAGON |
| ☐ | 1 BEHAVIOR RISK | 5 ESCAPE RISK (ER) | PURPLE HEXAGON |

UNASSIGNED SUBJECT FLAGS (ICONS) -WHITE FIELDS

ASSIGNED SUBJECT FLAGS (ICONS) -YELLOW FIELDS

*FIG. 4*

METHODS, SYSTEMS AND ARTICLES OF MANUFACTURE FOR MONITORING SUBJECTS WITHIN A FACILITY

RELATED APPLICATION

This application claims the benefit of and priority to U.S. Provisional Patent Application No. 61/166,377, filed Apr. 3, 2009, the disclosure of which is incorporated herein by reference as if set forth in its entirety.

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

FIELD OF THE INVENTION

The present invention relates generally to controlled facilities and, more particularly, to monitoring individuals within controlled facilities.

BACKGROUND

Controlled environment facilities, such as prisons, hospitals, nursing homes, assisted living centers, schools, and the like, typically utilize some method of monitoring the location of individuals therewithin. However, many such facilities have a need to know the location and movement of individuals both for safety and health reasons. Among safety concerns is the need to identify individuals who have entered restricted or unsafe areas within or even outside of a facility. Among health reasons is the need to identify medical conditions of individuals. Unfortunately, many such facilities may not have a way of easily monitoring individuals and their conditions. Some facilities, such as prisons, utilize hand written information on whiteboards, etc.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Embodiments of the present invention include systems, methods, and articles of manufacture for monitoring subjects within a facility. According to some embodiments of the present invention, a monitoring system includes a plurality of display devices located throughout a facility, and a data server in communication with the display devices. Typically, the display devices are located at important or strategic locations within the facility, such as entrances, exits, etc. If the facility is a prison, a display device may be located where guards are normally stationed. The data server displays information about subjects within the facility via the display devices. Displayed subject information includes identification information (e.g., a name and/or a picture, etc.) for a subject and one or more coded icons adjacent to the identification information, wherein each coded icon provides information about a respective subject attribute. Subject attributes can include medical attributes, dietary attributes, psychiatric attributes, behavior risk attributes, medication attributes, and any special attributes. In some embodiments, the displayed coded icons are arranged in rows and columns forming an array, wherein each row or column of coded icons provides information about a respective different category of subject attributes. For example, a first row or column of coded icons provides information about medical attributes of the subject, and a second row or column of coded icons provides information about behavior attributes of the subject, etc.

Various other types of information may be displayed about monitored subjects. For example, displayed subject information may include an indication of whether a subject is static and stabilized, an indication of whether a subject is in-transit, and/or an indication of whether a subject is on electronic monitoring. Subject information may also indicate a level of security associated with the subject. Displayed subject information may also include subject aliases, subject date of birth, subject allergy information, subject medication information, and subject medical device requirement information, etc.

Each subject within the facility has an information tag (e.g., an RFID tag) attached thereto that contains subject identification information. A plurality of information tag readers (e.g., an RFID reader) in communication with the data server are located throughout the facility, and an information tag reader may be located near each respective display device. Each information tag reader is configured to activate and read subject identification information from an information tag of a subject who comes within a predetermined distance of the reader. If the reader is located near a display device, the data server displays subject information for the identified subject on the display device. Thus, subject information may be displayed on a display device for all subjects within a vicinity of the respective display device, as detected by a tag reader.

In some situations, such as prisons, it may not be desirable for a subject within the facility to see subject information, either about herself or about another subject. As such, the data server can cause a display device to not display any subject information (e.g., can blank the screen or display something else, etc.) when a subject comes within a predetermined distance of the respective display device. The data server may also allow a user, such as a prison guard, to selectively display subject information about identified subjects within a predetermined distance of a respective display device and/or about any subjects within the facility at any location.

In some embodiments, the data server may cause one or more display devices within a facility to display an alert. For example, if two or more subjects that should not be in the same vicinity of each other are within a predetermined distance of each other, an alert may be displayed. The data server may cause one or more of the display devices to display an alert if a subject's information tag is removed or tampered with. Also, the data server may be configured to cause one or more display devices to display an alert if a subject crosses a restrictive boundary of the facility and/or enters a restricted area of the facility.

In some embodiments, the information tag includes a user-activatable switch that, when activated, sends an alert signal which can be read by a nearby tag reader. The data server is configured to display an alert on one or more of the display devices. The alert identifies the subject who sent the alert signal and the location of the subject within the facility.

The data server may have various features and functions, according to embodiments of the present invention. For example, the data server may be configured to communicate with remotely located law enforcement agencies and determine if an arrest warrant exists for any of the plurality of subjects within the facility. The data server also may be configured to allow an authorized user to positively identify a subject in the facility via access to subject information maintained by the data server. For example, if a subject is using an alias, various attributes of the subject may allow the data server to positively identify the subject. In some embodiments, the data server may be operatively connected to medical administration records (MAR) for subjects within a facility, and may be configured to cross-reference displayed information for a subject with a medical administration record for the subject. For example, if a medically trained individual is going through the facility passing out medications, the information tag on the person receiving the medication will display the photo, name, location, drug allergies, and any other pertinent information to the person dispensing on a handheld device or laptop. Simultaneously, the displayed information will bring up the inmates MAR and dosing schedule. In some embodiments, such electronic MAR systems can be integrated with this system for accuracy and safety of proper dispensing. Moreover, medication blister packs can have passive information tags (e.g., passive RFID tags) pertaining to specific classes of medications, and if an allergy to such medication exists, will alert the medical professional scanning the inmate's information tag to such inherent allergies.

Additionally, various program algorithms can be established to create time interval information tag scanning of a population such as diabetics who need their insulin injections prior to the meal. A list of such persons can be displayed to the respective staff tending to such needs or responsibilities. With such cross referencing to medication administration, potentially harmful or sentinel events can be avoided and become life saving.

In some embodiments, the data server may be configured to activate the plurality of information tag readers substantially simultaneously such that a roll call of subjects within the facility can be obtained by reading subject identification information from information tags located in the vicinity of each of the information tag readers. In some embodiments, the data server may be configured to display a checklist of tasks to be performed by or on a subject via a display device in the vicinity of the subject. The data server may also be configured to compile reports of task checklists for subjects.

In some embodiments, a second server is configured to archive subject information from the data server, and/or to share subject information from the data server with authorized users remotely located from the data server via, for example, mobile devices such as phones, PDAs, etc. Subject data may be displayed on a mobile device of an authorized user in any format including the format displayed via display devices within the facility. Various alerts may also be displayed on mobile devices of authorized users. The second server is located remotely from the facility and is in communication with the data server via a communications network, such as the Internet. Authorized users may remotely log in to the data server via the second server and obtain subject information, according to some embodiments of the present invention.

Accord to other embodiments of the present invention, a method of monitoring subjects within a facility includes reading, via an information tag reader, subject identification information from an information tag attached to a subject located in a vicinity of the information tag reader, and displaying, via a display device located near the information tag reader, information about the subject. The displayed information may include identification information for the subject, present location information for the subject within the facility, and a plurality of coded icons adjacent to the identification information, wherein each coded icon provides information about a respective subject attribute. Subject attributes can include medical attributes, dietary attributes, psychiatric attributes, behavior risk attributes, medication attributes, and any special attributes. In some embodiments, the displayed coded icons are arranged in rows and columns forming an array, wherein each row or column of coded icons provides information about a respective different category of subject attributes. For example, a first row or column of coded icons provides information about medical attributes of the subject, and a second row or column of coded icons provides information about behavior attributes of the subject, etc.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

FIGS. 3A-3E illustrate graphical user interfaces (GUIs) that are utilized by authorized personnel to perform various administrative functions for software that executes on a data server of the systems of FIGS. 2A-2C, according to some embodiments of the present invention.

FIG. 4 illustrates a GUI that is used to assign flags and icons for a subject being monitored, according to some embodiments of the present invention.

DETAILED DESCRIPTION

Figure 1:
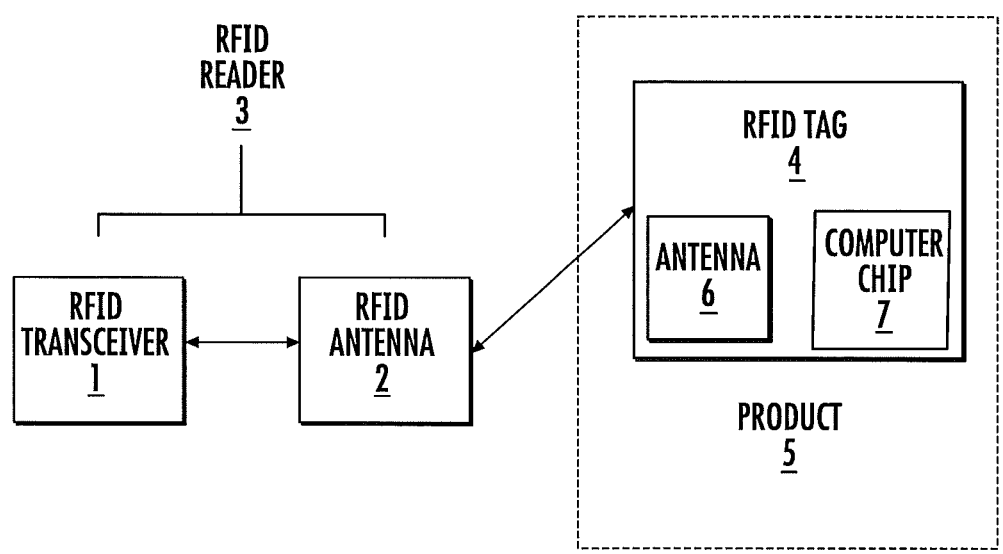
FIG. 1 is a schematic diagram illustrating operation of a radio frequency identification (RFID) reader and tag that may be utilized in some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

It will also be understood that, although the terms first, second, etc. may be used herein to describe various elements, these elements should not be limited by these terms. These terms are only used to distinguish one element from another. For example, a first monitoring station could be termed a second monitoring station, and, similarly, a second monitoring station could be termed a first monitoring station without departing from the teachings of the disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terms "attribute" and "condition", as used herein are interchangeable, and refer to aspects/issues/problems associated with a subject. Exemplary attributes/conditions include, but are not limited to, medical attributes/conditions, dietary attributes/conditions, psychiatric attributes/conditions, behavior risk attributes/conditions, medication attributes/conditions, etc.

The term "facility", as used herein, refers to an area delineated by a specific boundary, and includes both indoor areas and outdoor areas within the boundary. For example, a correctional institution, such as a prison, has a specific boundary and also typically includes both indoor areas and outdoor areas within the boundary.

The term "GUI control", as used herein, refers to graphical representations (e.g., application icons) and controls (e.g., buttons, scroll bars, etc.) that a user utilizes to interact with various GUIs. A GUI control performs one or more functions in response to activation by a user (e.g., mouse pointer and click; touching or tapping via a finger or stylus if a touch screen display is used).

The terms "coded icons" and "flags", as used herein, are interchangeable and are disguised indications of attributes/conditions of a subject. They are disguised in the sense that their meaning is not readily apparent to unauthorized viewers.

The term "subject", as used herein, refers to any living being (e.g., humans, animals, etc.) that is subjected to location monitoring via embodiments of the present invention. The term "subject" may also include inanimate objects that are subjected to location monitoring via embodiments of the present invention.

The present invention may be embodied as systems, methods, and/or articles of manufacture (e.g., one or more computer program products) for monitoring subjects within a facility. Embodiments of the present invention are described herein using a correctional institute or prison as an exemplary facility, and prisoners and prison employees as being the monitored subjects. However, it is to be understood that embodiments of the present invention may be utilized to monitor any subjects, including inanimate objects, in any type of facility (e.g., nursing homes, assisted living facilities, schools, camps, etc.), without limitation.

The present invention may be embodied in hardware and/or in software (including firmware, resident software, microcode, etc.). Furthermore, the present invention may take the form of an article of manufacture having computer-usable or computer-readable storage medium with computer-usable or computer-readable program code embodied in the medium for use by or in connection with an instruction execution system. In the context of this document, a computer-usable or computer-readable medium may be any medium that can contain, store, or communicate the program for use by or in connection with the instruction execution system, apparatus, or device. Embodiments of the present invention may be configured to be an integral part of a facility's existing internal program database of subjects or used as a stand-alone program.

The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), and a portable compact disc read-only memory (CD-ROM).

The present invention is described herein with reference to graphical user interfaces (GUIs), flowchart illustrations and block diagram illustrations of methods, systems, and articles of manufacture for monitoring subjects within a facility. It will be understood that each block of the flowchart and/or block diagram illustrations, and combinations of blocks in the flowchart and/or block diagram illustrations, may be implemented by computer program instructions and/or hardware operations. These computer program instructions are provided to a processor, or other programmable data processing apparatus to produce a machine, such that the instructions, which execute via the processor and create means for implementing the functions specified in the GUIs, flowcharts and block diagram blocks.

These computer program instructions may also be stored in a computer usable or computer-readable memory such that the instructions produce an article of manufacture including instructions that implement the functions specified in the GUIs, flowcharts and block diagram blocks.

The computer program instructions may also be loaded onto a controller or other programmable data processing apparatus to cause a series of operational steps to be performed on the controller or other programmable apparatus to produce a computer implemented process such that the instructions that execute on the controller or other programmable apparatus provide steps for implementing the functions specified in the GUIs, flowcharts, and block diagram blocks.

Embodiments of the present invention are designed to replace the dry-erase and wet-erase boards currently in use in various facilities (e.g., schools, nursing homes, hospitals, rehabilitation centers, group homes, prisons, etc.) that display information about subjects within such a facility. Embodiments of the present invention provide dynamically updated subject information to individuals responsible for subject monitoring and security, such as jailers, teachers, nurses, administrators, etc.

In some embodiments of the present invention, radio frequency identification ("RFID") technology is used to monitor and track subjects within a facility. For example, subjects are fitted with an article containing an RFID tag (e.g., a bracelet, badge, article of clothing, etc). In addition, on-site facility workers may also be fitted with articles containing RFID tags in order to monitor their location. For example, with respect to prisons and other correctional facilities, monitoring the on-site location of facility workers (e.g., guards, medical staff, etc.) can help assure that proper numbers of assigned staff are in particular areas, which can reduce liability, particularly when questions arise related to workforce numbers and movements, and can help assure adequate response to areas when summoned. However, embodiments of the present invention are not limited to the use of RFID technology. Various technologies may be utilized for detecting the location of subjects within a facility. Exemplary other technologies include, but are not limited to, infrared detection technologies, video detection technologies, motion detector technologies, Blue Tooth®, GPS, metal detector technologies, biometric technologies, weight reference technologies, handwriting and speech recognition technologies, etc.

As is known to those of skill in the art, RFID refers to a class of applications in which items that are to be tracked are "tagged" with an RFID tag. An RFID tag is a specially designed electronic tag, which is typically implemented as the combination of a computer chip and an antenna, that is placed on, or embedded in, an object. These RFID tags work in conjunction with an RFID transceiver and an RFID antenna. An "RFID transceiver" refers to a class of circuit(s), chip(s) or device(s) that transmit a signal that may be used to: (a) energize or "excite" an RFID tag, and (b) receive and demodulate and/or decode information that is transmitted by the energized RFID tag. The RFID transceiver may comprise a single circuit, chip or device, or may comprise multiple circuits, chips and/or devices. A variety of RFID transceivers are commercially available such as, for example, the Philips HTRC110 IC RFID transceiver. RFID antennas refer to a type of antenna that emits a field in response to receiving a signal from, for example, an RFID transceiver. The RFID antenna may also receive and pass to the RFID transceiver a signal that is transmitted from an excited RFID tag. Operation of the principles of radio frequency identification will now be described with reference to FIG. 1.

As shown in FIG. 1, an RFID transceiver 1 sends a signal to an RFID antenna 2. Collectively, the RFID transceiver 1 and RFID antenna 2 are referred to as an RFID reader 3. The RFID antenna 2 broadcasts the signal as a radio frequency ("RE") broadcast signal. This RF broadcast signal may comprise, for example, an alternating current signal of fixed amplitude and frequency, with the frequency matching the resonance frequency of the RFID tags that are to be read. As is also shown in FIG. 1, an RFID tag 4 is attached to on or embedded in a product 5, such as a bracelet, identification card, article of clothing, etc. The RFID tag 4 includes an antenna 6 and a computer chip 7 in which information is stored. This stored information may be virtually any type of information. In the context of embodiments of the present invention, information stored within an RFID tag 4 includes, but is not limited to, subject identification information.

The RFID tag antenna 6 receives the RF broadcast signal from the RFID reader 3. This received RF broadcast signal energizes the RFID tag 4, causing the RFID tag 4 to transmit information back to the RFID transceiver 1 by altering the load placed by the RFID tag 4 on the RF broadcast signal that is transmitted by the RFID antenna 2. This variation in load causes the amplitude of the RF broadcast signal to vary over time. The information transmitted by the RFID tag 4 to the RFID transceiver 1 includes, for example, the subject identification information that is stored in the computer chip 7 of the RFID tag 4 (and perhaps other information as well).

The RFID transceiver 1 detects these variations in the amplitude of the RF broadcast signal, demodulates them, and converts them from an analog signal to a digital signal. A microcontroller (which may, for example, be embedded within the RFID transceiver 1 or which may be a separate controller) may then determine the subject identification information associated with the RFID tag 4 from this digital signal. In this manner, an RFID system can identify and track each RFID tagged subject within a facility that comes within a specified range of an RFID reader 3.

As used herein, the term "information tag" includes, but is not limited to, an RFID tag. An information tag utilized by embodiments of the present invention may include other tag/reader technologies, as well. The embodiments described herein will refer to an RFID tag and RFID reader, but it will be understood that other types of information tags and readers may be utilized.

Figure 2A:
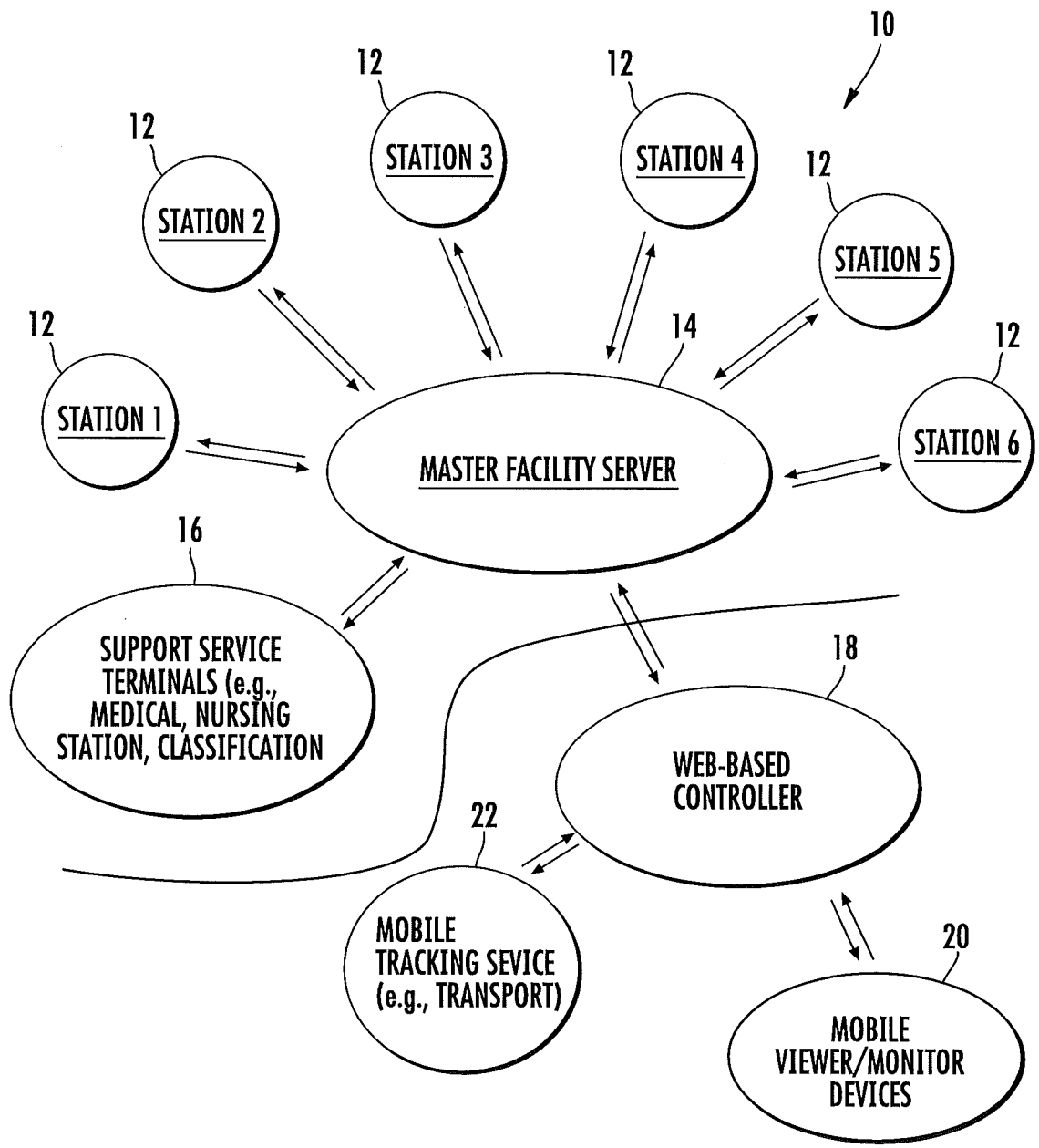
FIGS. 2A-2C illustrate systems for monitoring subjects within a facility, according to some embodiments of the present invention.

FIG. 2A illustrates a system 10 for monitoring subjects within a facility, such as a prison, in accordance with some embodiments of the present invention. Subjects within the facility have an RFID tag attached thereto (e.g., via a bracelet, badge, identification card, article of clothing, etc.) that contains subject identification information. The illustrated system 10 includes a plurality of monitoring stations 12 located throughout the prison and a data server 14 (referred to in FIG. 2A as a "master facility server") in communication with the monitoring stations 12. The illustrated system 10 also includes one or more support service terminals 16 in communication with the data server 14.

The data server 14 is the central data repository and central controller of subject information. The data server 14 centrally compiles subject data and icons representative of various subject conditions, as submitted by various facility departments. For example, a prison may include a medical department, a booking department, a dietary department, etc. Each of these departments will provide subject information to the data server 14 via a support service terminal 16 for subjects within the facility. Each support service terminal 16 is an on-site entry point for data input, data modification, icon assignments and communication generation. The data server 14 creates and displays various coded icons (designed intentionally to be arbitrary and coded to disguise information from unwanted viewings) that are representative of various information, as described below. The data server 14 also interfaces with various external devices and services via a remotely located server 18 (labeled in FIG. 2A as a "web-based controller").

Standardized icons or flags are designed pragmatically to represent a situation and/or subject at hand and to be easily understood by a user of the system 10. The icon designs may be transferable and universal between facilities or may be unique to a particular facility. Icon features are provided in a master set of options and customized icons can be created with permission as needed from basic icon building components of the program.

The data server 14 may be located on-site (e.g., at a particular facility) or may be located off-site (e.g., not at a particular facility). Although a single data server 14 is illustrated, it is understood that multiple data servers may be utilized to perform the functions of the illustrated data server 14. The data server 14 and monitoring stations 12 may communicate with each other via a LAN, WAN, intranet, the Internet or any suitable network. In some embodiments, the data server 14 and monitoring stations 12 may communicate with each other wirelessly.

Figure 2B:
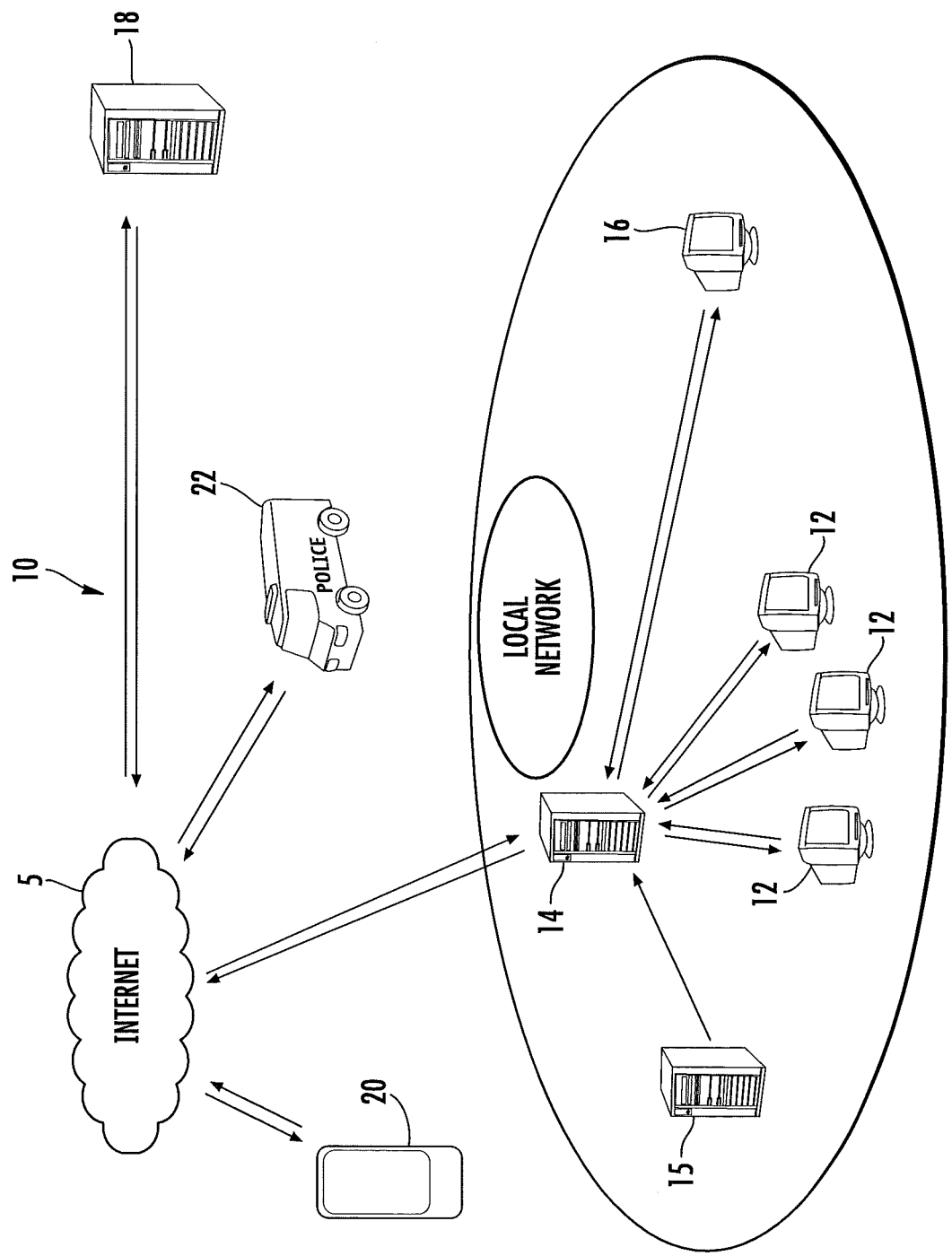
Figure 2C:
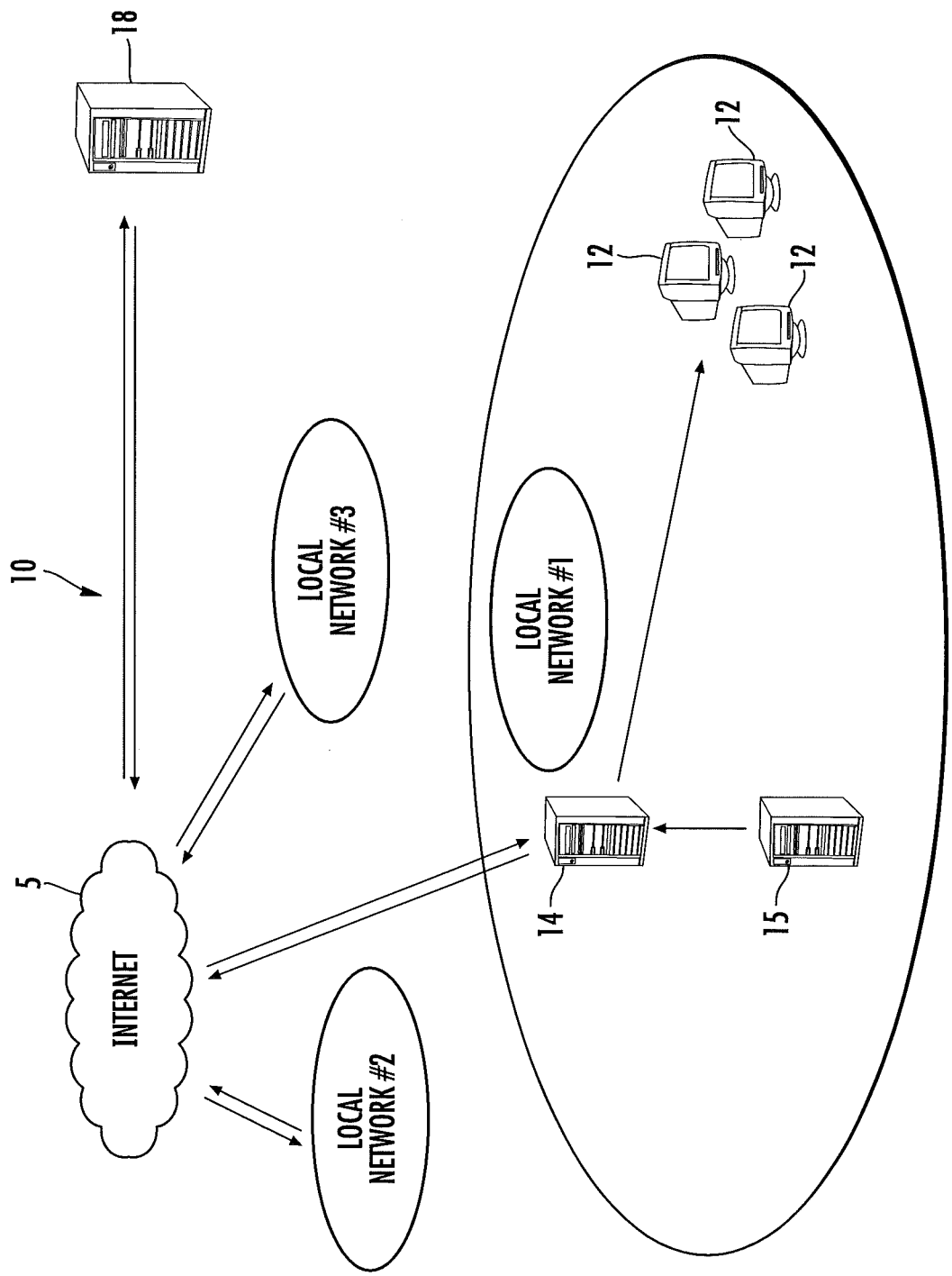

FIGS. 2B and 2C illustrate systems 10 for monitoring subjects within a facility, according to other embodiments of the present invention. In FIG. 2B, the illustrated system 10 includes a plurality of monitoring stations 12, one or more support service terminals 16, a data server 14, and a database server 15 interconnected via a local area network. The database server 15 is considered the local host server for a given facility, and from which the data server 14 has a code level integration to share pertinent information. Much of this information is of a demographic nature. An example would be a jail management system in place at a correctional facility that stores information about inmates including date of birth, address, ID photos, and criminal or court related information. The data server 14 interfaces with mobile devices 20 and mobile tracking services 22 via a server 18 connected to the Internet 5 or other computer network, and remotely located from the data server 14. For example, mobile devices 20 external to the local area network may communicate with the data server 14 via the remote server 18 and display information about subjects within the facility similar to that displayed on the display devices 30 within the facility. For authorized personnel, various administrative tasks can be performed via mobile devices 20, as well.

FIG. 2C illustrates a system 10 wherein a remotely located server 18 communicates with and manages multiple local area networks for one or more facilities having monitoring stations 12, support service terminals 16, a data server 14, and a database server 15 interconnected. The system configuration of FIG. 2C is advantageous for, among other things, sharing information with multiple facilities. For example, upon an inmate release (or other major event) data for the inmate is sent to and archived by the remotely located server 18. This data can then be retrieved by a data server 14 at any of numerous other facilities.

Each monitoring station 12 may be positioned, for example, at a strategic location within a facility (e.g., cell block entrance, classroom, nursing station, entrance and egress points, where a guard or other prison employee is typically stationed, etc.). However, monitoring stations 12 may be located anywhere within a facility. Each monitoring station 12 would typically allow access to only authorized personnel, for example, by the use of passwords, user identifications, etc.

Figure 2D:
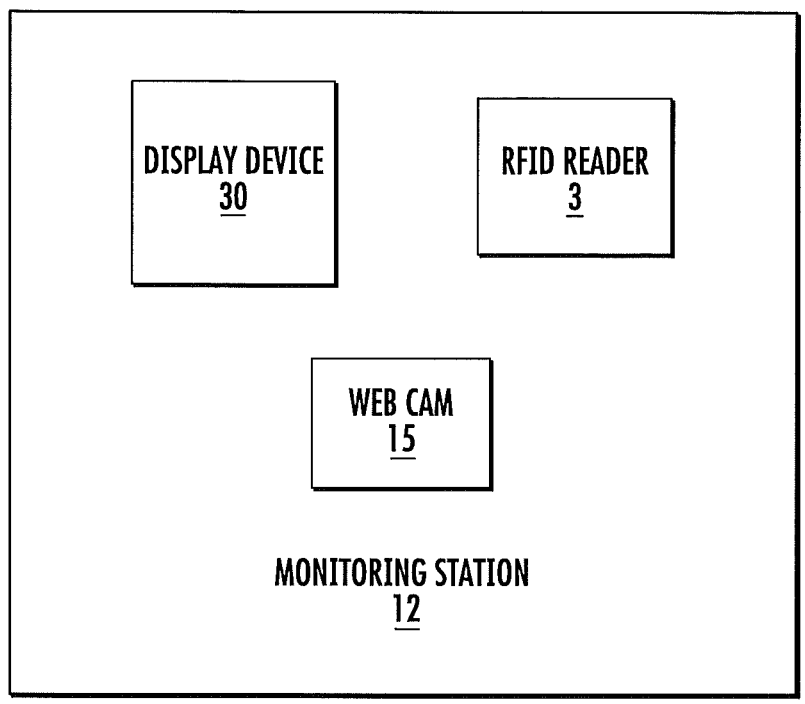
FIG. 2D illustrates an exemplary monitoring station of the systems of FIGS. 2A-2C, according to some embodiments of the present invention.

According to some embodiments of the present invention, each monitoring station 12 includes a display 30 and an RFID reader 3 located near the display 30 (FIG. 2D). Each RFID reader 3 is configured to activate and read subject identification information from subject RFID tags 4 (e.g., RFID tags within bracelets, badges, identification cards, articles of clothing, etc., that are attached to subjects) that are located in the vicinity of the reader 3. RFID readers 3 may be located in various locations within a facility and need not have a display 30 located nearby. As such, the term "monitoring station" also includes embodiments where a display device and tag reader are not located near each other.

In some embodiments, a monitoring station 12 may include a video camera, such as a web-cam 15 (or other type of camera) to facilitate two way communications with other monitoring stations 12 within and/or outside of the facility, as the need arises. A camera may also be located near a tag reader 3 and configured to capture an image of a subject in the vicinity of the tag reader 3 when the tag reader reads information from a tag 4 associated with the subject.

Figure 5:
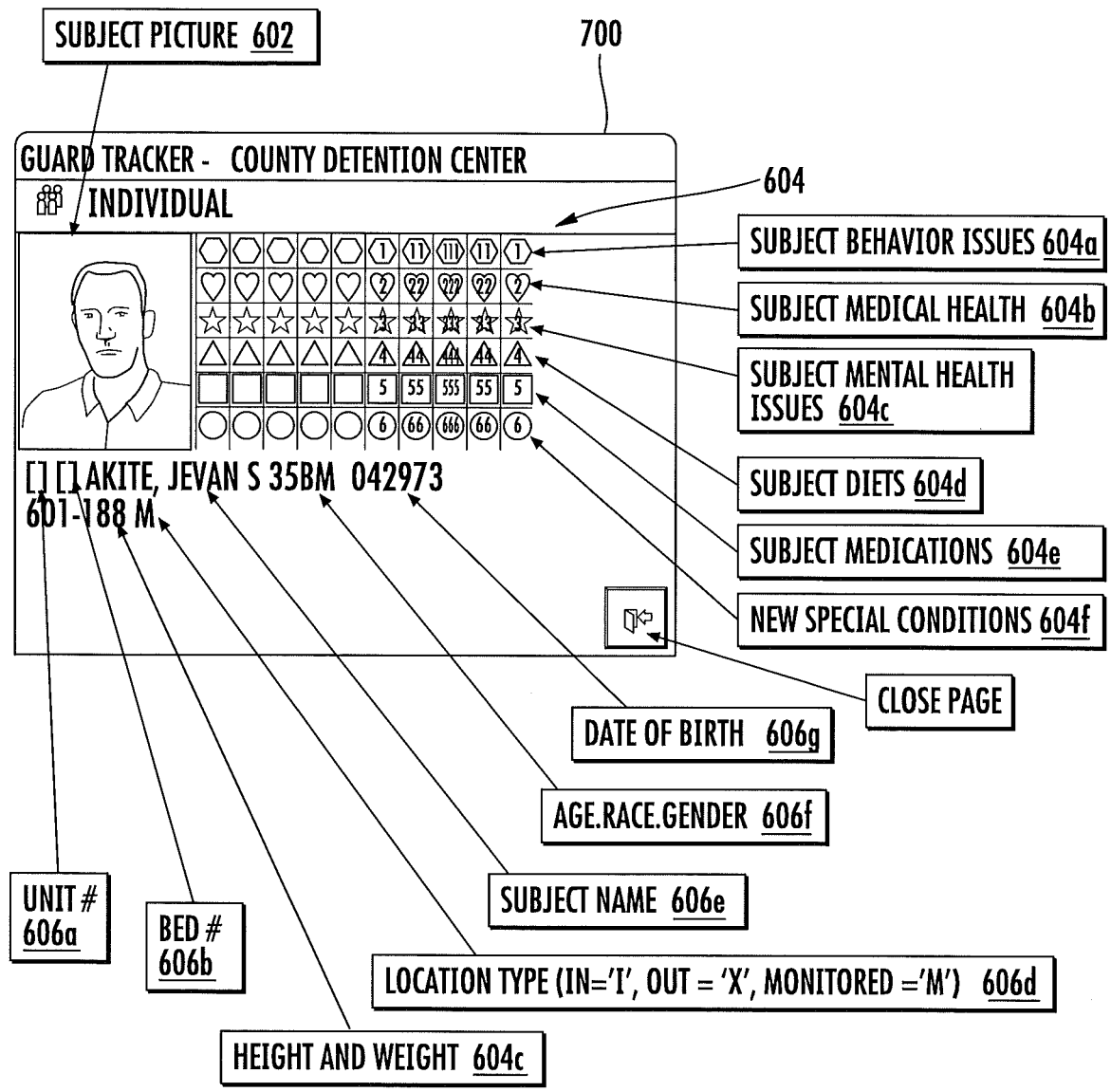
FIGS. 5-7 illustrate various ways subject data is displayed within a display device of a monitoring station and mobile device of the systems of FIGS. 2A-2C, according to some embodiments of the present invention.

The data server 14 is operatively connected to the RFID readers 3 and display devices 30. The data server 14 displays information about subjects within the facility on the display devices 30. Exemplary displayed information may include an identification picture of each subject, name, aliases, if any, and present location information for each subject within the facility, and one or more coded icons adjacent to each subject's information, wherein each coded icon relates to a respective subject attribute (FIG. 5). The various icons may have different colors, shapes, and identifiers, as will be described in detail below.

Figure 6:
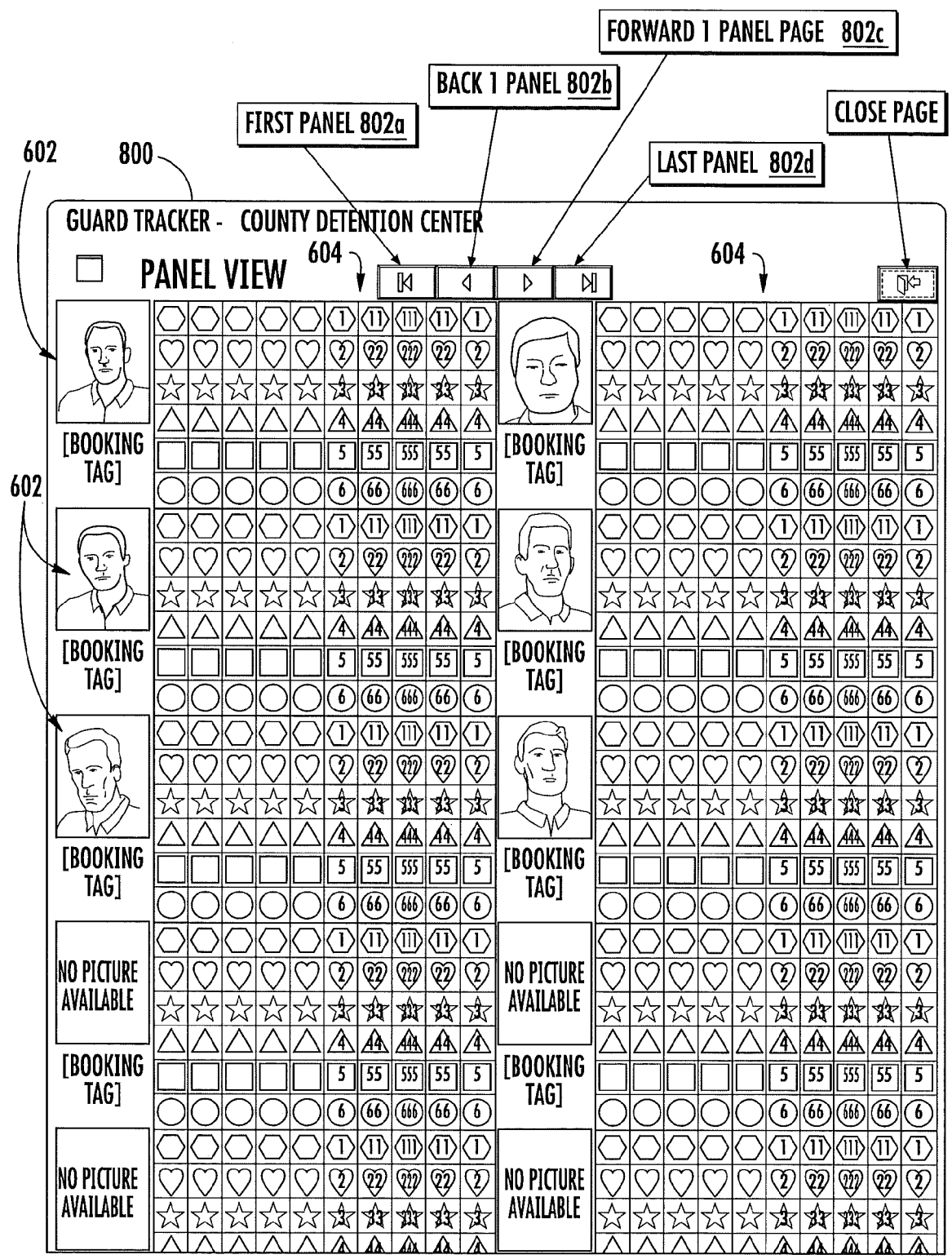
Figure 7:
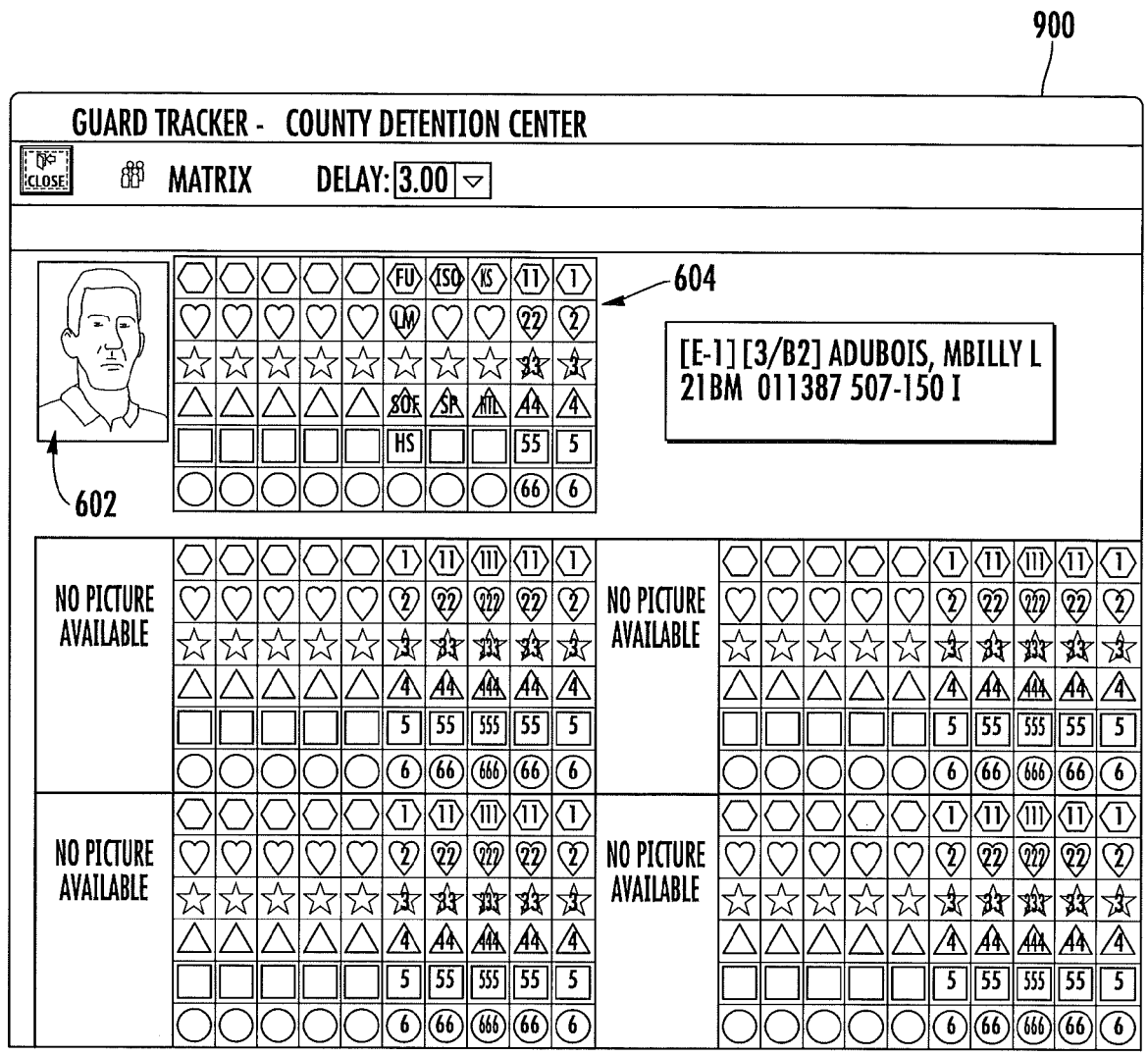

In some embodiments, each monitoring station 12 may normally display information about many subjects at the same time (FIGS. 6 and 7). Authorized personnel can scroll through the displayed information and select individual subjects for display of more detailed subject information (FIG. 5). Moreover, subject information is dynamically displayed. In other words, updates and additions to subject information are displayed in real time. In addition, location information for subjects is updated in real time, as subjects move throughout a facility, via RFID reader input, etc. Displayed subject information is regularly updated by extracting current information including, but not limited to, photo identifications, housing unit, cell locations, behavioral patterns, classification status, such as disciplinary segregation, administrative segregation, protective custody, keep separate, suicidal observation, medical observation, 12-24 hours close watch, very dangerous inmate and health issues from a computerized data file in the data server 14.

In some embodiments of the present invention, when a subject comes within a predetermined distance (e.g., 10 feet, etc.) of a particular monitoring station 12, the RFID reader associated with the monitoring station 12 "positively identifies" the particular subject via the unique identifier in the subject's RFID tag and, as a result, the data server 14 causes only information about the positively identified subject to be displayed on the respective monitoring station display device. Information displayed may include a subject's unique features (e.g., gender, race, weight, height, tattoos, etc.), and this may be used to verify that the identified subject is, in fact, the subject identified via the RFID tag. The minimum distance that is required for a tag reader to obtain subject information from a tag may be variable and embodiments of the present invention are not limited to a particular minimum distance.

In some embodiments, the data server 14 may cause the display device of a monitoring station 12 to "go blank" or otherwise not display any subject information (e.g., display a background image or something else that masks the subject information, etc.) when a subject comes within a predetermined distance (e.g., 10 feet, etc.) of a particular monitoring station 12, thereby precluding information from being viewed by anyone but an authorized person. Such a predetermined distance may be variable and embodiments of the present invention are not limited to any particular distance. The decision to "blank" a display device may depend on who the particular subject is within a predetermined distance of the monitoring station 12. Thus, for some subjects, the data server 14 may not blank a display device.

In some embodiments, the data server 14 causes one or more display devices, for example, at respective monitoring stations 12 to display alerts when various conditions exist. For example, when two subjects who should not be in the same vicinity of each other are within a predetermined distance of each other, as detected by an RFID reader, an alert is displayed on one or more monitoring station display devices. The data server 14 also causes one or more display devices at respective monitoring stations 12 to display an alert when a subject is within an area of the facility that he/she should not be in and/or when a subject crosses a restrictive boundary of the facility, as detected by an RFID reader. The data server 14 may also cause one or more display devices at respective monitoring stations 12 to display an alert when a subject comes within a predetermined distance of some item or area of a facility. For example, a medication cart may be fitted with an RFID reader. When the RFID reader associated with the medication cart detects an unauthorized subject within a predetermined area thereof, an alert is displayed within one or more monitoring station display devices.

In some embodiments, the data server 14 can utilize various algorithms to generate a birds-eye map of a facility and identify locations within the facility that may be off limits, or restrictive to certain subjects. For example, in a correctional facility, a subject's information tag would alert the data server 14 if the subject goes beyond restrictive areas, or outside access doors without permission, etc. In a nursing home, the information tag of a dementia patient, for example, who wanders past an open or unlocked door without notice will set off an alarm to the various monitoring stations 12. Each will immediately display the patient's picture and information, and give location information. In some embodiments, location information is based on triangulation technology (e.g., triangulation using RFID antennas) or other such technologies.

In addition, the data server 14 may cause one or more of the monitoring station display devices 30 to display an alert if a subject's RFID tag is removed or tampered with. For example, a circuit within an RFID tag attachment device (e.g., a bracelet, etc.) may be disrupted if the attachment device is removed from a subject. This circuit disruption would cause the RFID tag to fail and subsequently provide no response (null alert) to the system upon interrogation. Similarly, for tag attachment devices tampered with (e.g., disabled somehow due to blunt trauma, electrical exposure, covering by metal wrapper, etc.) the RFID readers using a pulsating review at arbitrarily assigned time intervals (e.g., every 30 seconds, etc.) will alert users as the number of subjects previously assigned and previously registered to a contained area is inaccurate. This can initiate an overall system check of all subjects to find the faulty/tampered with RFID device. The contained area would have new entrants and exiting subjects added and subtracted to the area automatically upon such movements.

In some embodiments, RFID tags attached to subjects may include a user-activatable switch. When the switch is activated, the tag sends out an alert signal which can be detected and read by a nearby tag reader. When a tag reader detects and reads such an alert, the data server 14 is configured to display an alert on one or more of the display devices throughout the facility. The alert identifies the subject who sent the alert signal and the location of the subject within the facility. For example, if an officer or a nursing home patient should be in trouble, hurt or attacked, they can press a button on their RFID tag to send out an alert.

Still referring to FIG. 2A, the illustrated system 10 also includes a remotely located server 18 in communication with the data server 14. The remotely located server 18, in turn, communicates with one or more mobile services devices 22 and one or more mobile devices 20. The remotely located server 18 is an integrated, web-based proprietary access point for data exchange and remote system support. The remotely located server 18 performs various functions including but not limited to: 1) providing access for data exchange between mobile devices or computers 20 (e.g., handhelds, smartphones, Blackberrys, PDAs, laptops, I-phones, or other available mobile devices); 2) providing entry and exit point for data digestion and information perpetuation to and from Mobile Services 22 (e.g., transport vans, school buses, patrol cars, medical vehicles, etc.); and 3) interfacing with the data server 14 for program changes, updates, advertising, alerts, etc.). The remotely located server 18 may function in a stand-alone mode interfacing between mobile devices 20 and mobile services 22. In some embodiments, the remotely located server 18 can be integrated with other web-based software systems such as EMR (electronic medical record), and/or other correctional/monitoring systems.

The remotely located server 18 is also configured to archive subject information from the data server 14, and/or to share subject information from the data server 14 with authorized users remotely located from the data server 14. In some embodiments, the data server 14 can call up a medical template containing pertinent information, edit the template, and upload the information to the remotely located server 18 for archiving, sharing with other outside facilities, etc. Such a template may include past medical diagnosis, medications, allergies, surgical history, psychiatric history, etc.

A mobile service device 22 is a transportation communication device that registers riders and tracks exact positioning of a vehicle with tracking systems such as GPS monitoring. Each mobile service device 22 performs various functions such as: 1) provides real-time monitoring for all riders either by entry and exit from a vehicle by RFID sensors (or other types of sensors) on the riders via devices mounted on the vehicle; 2) transmits subject entry-exit activities in real-time wirelessly back to the remotely located server 18; 3) transmits vehicle location in "real-time" wirelessly back to the remotely located server 18, from which queries can be performed from any site facility or subscriber (e.g., parent, probation officer, school representative, etc.); 4) monitors prescribed acceptable entry and exit points as assigned to subjects with alarms and alerts automatically sent upon limitation or site breach; 5) allows integration with back end systems which can send alerts (e.g., telephonic messaging, text messages, etc.) to appropriate individuals or authorities (e.g., parents, law enforcement agencies, etc.). Exemplary uses for a mobile service device 22, in accordance with embodiments of the present invention, includes tracking/monitoring the location of school children exiting a school bus without consent or authorization, tracking the location of nursing home patients who become lost and disoriented, etc.

According to embodiments of the present invention, authorized personnel can access the data server 14 via the remote server 18 and view subject data from locations remote from a facility via mobile devices 20, such as handhelds, smartphones, Blackberrys, PDAs, laptops, I-phones, etc. Access can be controlled via levels of authorization, as would be understood by one skilled in the art.

Referring now to FIGS. 3A-3E, graphical user interfaces (GUIs) are illustrated that are utilized by authorized personnel to perform various administrative functions for software that executes on the data server 14 for implementing embodiments of the present invention. These illustrated GUIs are generated by software executing on the data server 14 and are displayed on a support service terminal 16 and monitoring station 12, as appropriate, and, in some cases, on mobile devices 20. Via GUI 100 in FIG. 3A, an authorized user can access the menu of available options that the user's level of security allows.

Figure 3A:
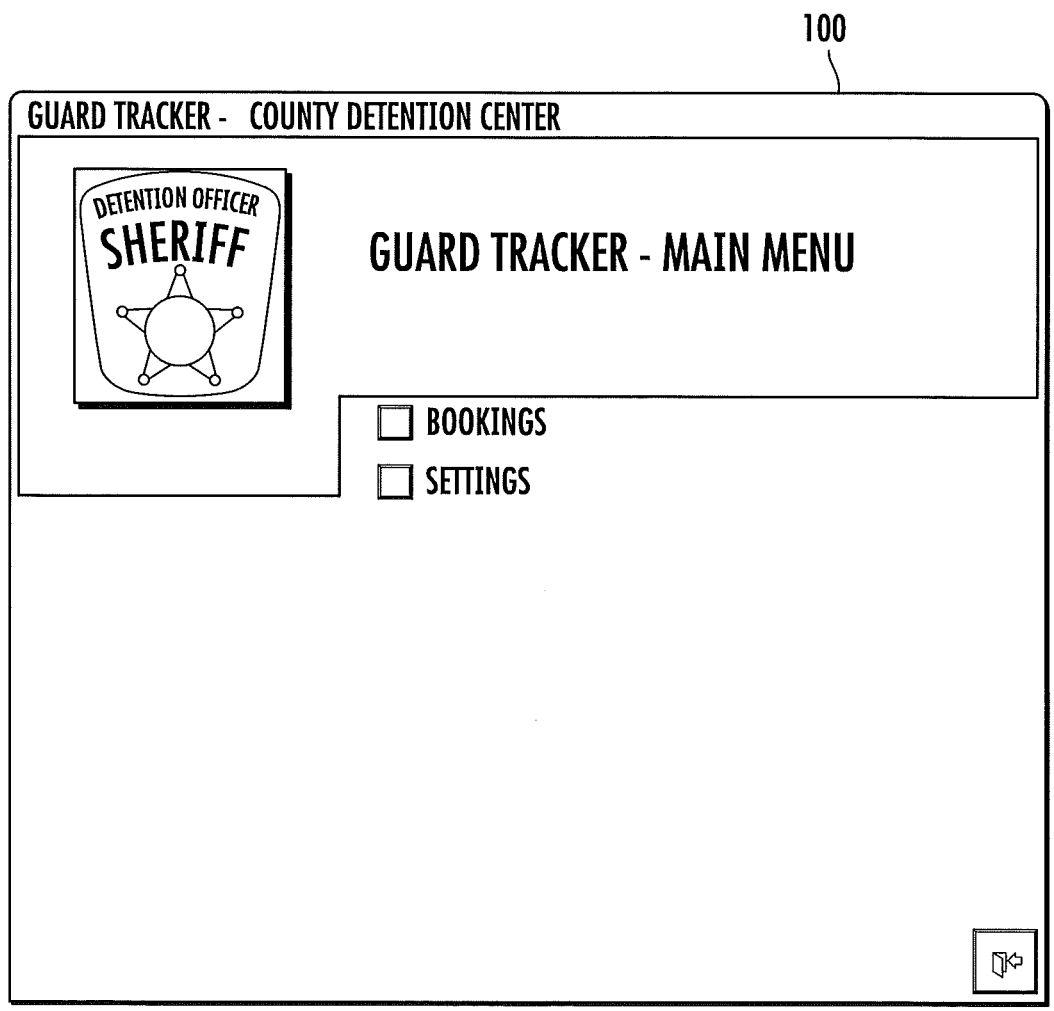
Figure 3B:
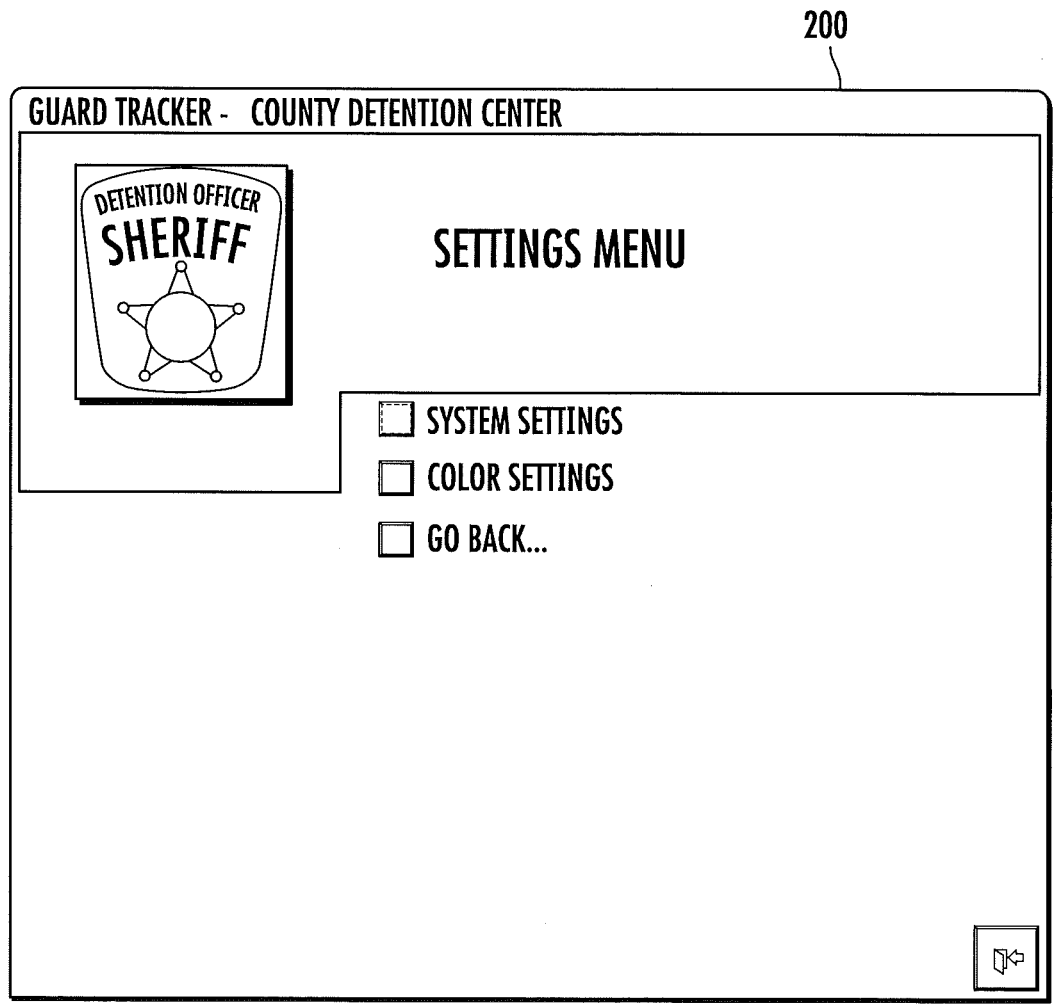
Figure 3E:
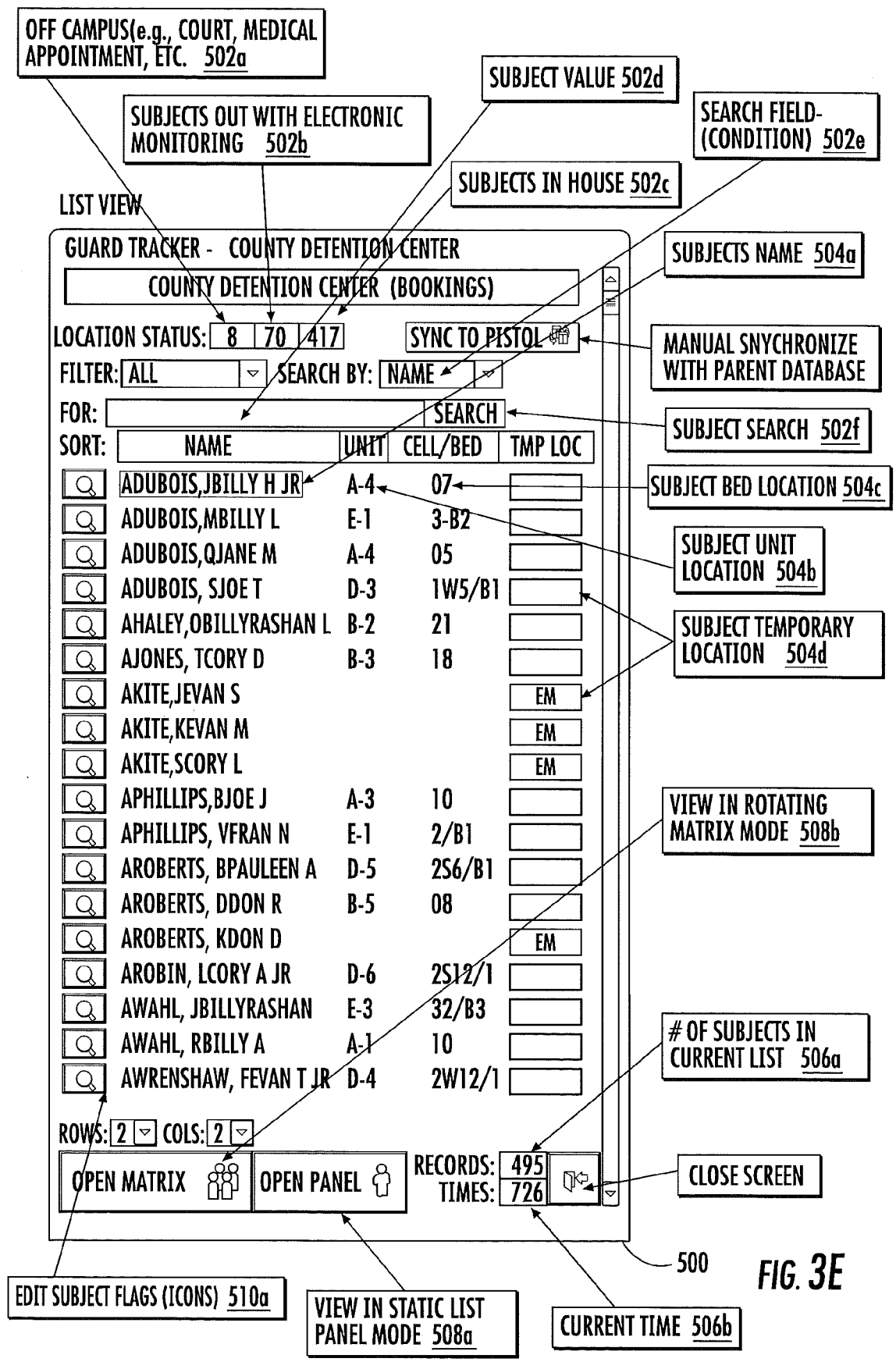

Via GUI 200 in FIG. 3B, an authorized user can adjust system settings and system colors (e.g., icon colors, alert colors, etc.). GUI controls in FIG. 3B can present the user with various menus and interfaces for controlling system settings, color settings, and other parameters. GUI 300 in FIG. 3C is one of several GUIs referred to as the Administrator System Dashboard, and allows an authorized user to make/edit various system configuration settings. GUI 400 in FIG. 3D is another of several GUIs referred to as the Administrator System Dashboard, and allows an authorized user to make various color settings for displayed GUIs. GUI 500 in FIG. 3E provides access to all information about subjects in a facility. A user can search subject information and can edit subject information via GUI 500. For example, field 502*a* displays a total number of subjects located off campus (i.e., outside the facility), such as subjects in court, attending a medical appointment, etc. Field 502*b* displays a total number of subjects located off campus (i.e., outside the facility) with electronic monitoring. Field 502*c* displays a total number of subjects presently within the facility.

Within field 502*d*, an authorized user can enter subject information for a search. Field 502*e* allows an authorized user to select the condition to be searched. For example, in the illustrated GUI 500, a user has selected "Name" as the condition in field 502*e*. Thus upon entering a name in field 502*d* and then activating GUI control 502*f*, a user can perform a name search for subjects in the facility (or for subjects in a database). GUI 500 displays various information about subjects, including name in field 504*a*, unit location in field 504*b*, bed location in field 504*c*, temporary location, if any, in field 504*d*. GUI 500 also displays a total number of subjects in the displayed list via field 506*a* and the time of day in field 506*b*. An authorized user can add and edit subject information for each subject in GUI 500 via a respective GUI control 510*a* for each subject.

FIG. 3E displays a comprehensive facility list (control console) with various options to view subsets of subjects while allowing visual viewing of a subject graphically along with icons. An authorized user can select the mode of display of subject information in a display device via GUI controls 508*a* and 508*b*. User activation of GUI control 508*a* displays subject information in a monitoring station display 30 in static list panel mode. User activation of GUI control 508*b* displays subject information in a monitoring station display 30 in rotating matrix mode.

FIG. 4 illustrates a GUI 600 that is used to assign/edit flags and icons for a subject. The illustrated GUI 600 includes a picture 602 of a particular subject, and an array of coded icons 604 that relate to various attributes/conditions of the particular subject. Icons 604 are selected from display box 606, as illustrated. Codes represented by numbers in the icons are assigned here, also. Each number is a code for a particular aspect of an attribute/condition represented by an icon. For example, the number "2" within a hexagon icon indicates a subject is "extremely dangerous." This may also be represented by the code "XD" within the hexagon icon.

Table 1 below sets forth categories of subject attributes and characteristics for which icons are associated with, according to some embodiments of the present invention.

TABLE 1

| | |
|---|---|
| 1) Behavior Risk: | |
| Extremely Dangerous | XD |
| Escape Risk | ER |
| Keep Separate* | KS |
| Admin. Lock-down | LD |
| 2) Medical Problems: | |
| Seizures | SZ |
| Diabetes | DM |

TABLE 1-continued

| | |
|---|---|
| Heart Condition or Hypertension | HT |
| Infectious Disease | IF |
| 3) Mental Illness: | |
| Suicidal | SU |
| Psychosis | PS |
| Alcohol or Drug withdrawal | AD |
| Uncooperative | UC |
| 4) Special Diet: | |
| Diabetic | DM |
| No Canteen | NC |
| Special Diet | SD |
| No Utensils | NU |
| 5) Medications Due: | |
| Morning | AM |
| AM & PM | BD |
| Three times a day | TD |
| Bedtime | HS |
| 6) Special Conditions: | |
| New Detainee** | ND |
| First Timer** | FT |
| Weekender** | WE |
| Manipulative | MN |

*Specifies other subject to avoid contact with
**Automatically ends after 72 hours FIGS. 5-7 illustrate various ways subject data is displayed within a display device of a monitoring station 12 and mobile device 20, according to some embodiments of the present invention. In FIG. 5, an individual subject profile 700 is illustrated. The illustrated subject profile 700 includes a picture 602 of a particular subject and an array of coded icons 604 positioned adjacent to the picture 602. As described above, these coded icons 604 indicate various attributes/conditions of the particular subject. For example, the first row 604*a* of icons in the array relate to behavior issues, the second row 604*b* relates to medical/health issues, the third row 604*c* relates to mental health issues, the fourth row 604*d* relates to dietary issues, the fifth row 604*e* relates to medication issues, and the sixth row 604*f* relates to special conditions or attributes that the particular subject has. Additional subject information is displayed beneath the picture 602 and array of coded icons 604, as illustrated. This additional information includes unit number 606*a*, bed number 606*b*, height and weight 606*c*, location type 606*d*, subject name 606*e*, age-race-gender 606*f*, and date of birth 606*g*. Embodiments of the present invention are not limited to the illustrated arrangement in GUI 700. An array of icons 604 may be arranged within a GUI in various ways in accordance with embodiments of the present invention.

FIGS. 6 and 7 illustrate various ways subject information can be displayed. In FIG. 6, information about a plurality of subjects is displayed at the same time within GUI 800. GUI controls 802*a*, 802*b*, 802*c*, 802*d* are display controls for information displayed in GUI 800. For example, GUI control 802*a*, when activated, displays a first panel of subject information. GUI control 802*b*, when activated, displays a panel of subject information preceding the presently displayed panel. GUI control 802*c*, when activated, displays a panel of subject information following the presently displayed panel. GUI control 802*d*, when activated, displays the last panel of subject information.

In FIG. 7, information about a plurality of subjects is displayed in a rotating manner within GUI 900. A monitoring station display device may display GUI 800 or 900 during normal monitoring and may switch to GUI 700 to display information about a specific subject, for example, when a specific subject comes within a predetermined distance of the monitoring station 12, as described above.

Figure 8:
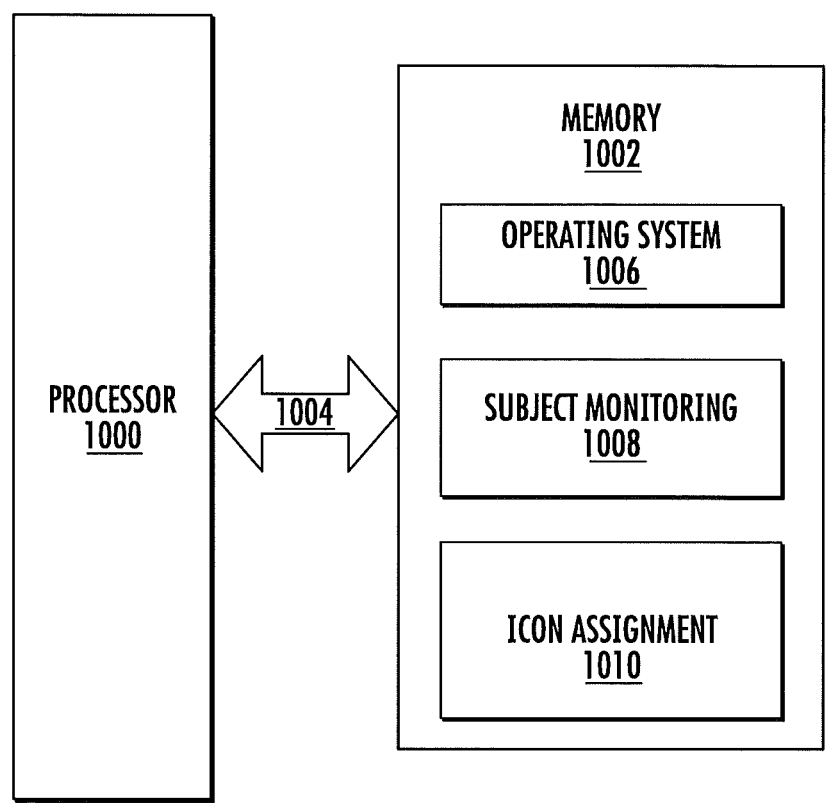
FIG. 8 is a block diagram that illustrates a software architecture for implementing operations of embodiments of the present invention.

FIG. 8 illustrates a processor 1000 and a memory 1002 that may be used to implement the operations of embodiments of the present invention. The processor 1000 communicates with the memory 1002 via an address/data bus 1004. The processor 1000 may be, for example, a commercially available or custom microprocessor. The memory 1002 is representative of the overall hierarchy of memory devices containing the software and data used to monitor subjects within facilities and perform the various functions described above. The memory 1002 may include, but is not limited to, the following types of devices: cache, ROM, PROM, EPROM, EEPROM, flash, SRAM, and DRAM.

As shown in FIG. 8, the memory 1002 may hold three or more major categories of software and data: an operating system 1006, a subject monitoring module 1008, and an icon assignment module 1010. The operating system 1006 controls operations of the subject monitoring module 1008. The subject monitoring module 1008 comprises logic for monitoring subjects within facilities, dynamically displaying information about them, providing alerts to authorized personnel, etc., as described above. The icon assignment module 1010 comprises logic for assigning icons and flags based on evaluative findings carried out prior to data entry Although FIG. 8 illustrates an exemplary software architecture that may facilitate monitoring subjects within a facility, it will be understood that the present invention is not limited to such a configuration, but is intended to encompass any configuration capable of carrying out the operations described herein.

Computer program code for carrying out operations of the present invention may be written in a high-level programming language, such as Python, Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Manual Tracking

Embodiments of the present invention may also be utilized in facilities without automatic subject monitoring and tracking technologies, such as RFID technology described above. For example, a facility may include a plurality of monitoring stations 12 located throughout the facility and a data server 14 in communication with the monitoring stations 12. The various monitoring stations 12 include a display device but are not equipped with an RFID reader or other monitoring technology. The display devices will display information about the subjects within the facility, for example as illustrated in FIG. 6. When a particular subject approaches a display device, an authorized user can manually "blank" the screen. In addition, an authorized user can indicate, via a user interface, the presence of one or more subjects in a particular area. For example, a GUI may include a series of buttons that an authorized user could activate which indicate the presence of a subject in a particular area of the facility. The GUI may include buttons that allow a user to indicate the change in location of a subject when moving from one area to another, or from the facility to someplace off-site (e.g., hospital, medical office, courthouse, etc.). For example, a user can indicate that a subject is "off-site" and can indicate where the subject is (i.e., identify the off-site location). The above-described manual tracking also can be performed on a touch screen of a pda, smartphone, laptop, etc.

Mobile Tracking

Embodiments of the present invention are particularly advantageous for mobile tracking scenarios where it is desirable to track subjects in transit. For example, according to some embodiments of the present invention, a mobile device 20 may be used by an authorized user in a transport vehicle 22. When each subject enters the vehicle, the authorized user activates a button/control within a GUI indicating positive location of the subject on the vehicle and, conversely, when the subject exits, the authorized user activates a button/control within a GUI indicating that the subject is exiting the vehicle, and can indicate the location where the subject is exiting. In the data server 14, the location status of the subject is stored in real time. For example, during travel from a facility, a subject's location can be indicated as "in vehicle." Once at the destination, the subject's location can be indicated as at the destination (e.g., "at court", "at medical office, "at hospital", etc.). The data server 14 keeps all of the monitoring stations 12 updated with this information.

With respect to prison use, mobile tracking embodiments of the present invention can help identify where a potential breach or escape by a subject occurred and at what time. Additionally, in the case of use in a nursing or rest home, the nursing staff can make rounds and use this same function to indicate the status of a patient (e.g., "patient resting", "patient sleeping", etc.). The nursing staff can also use functions to indicate when a task has been carried out, such as aiding a patient in feeding, dressing, bathing, security bed checks, etc. Such information is stored, collated and can be printed at predetermined intervals.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A system for monitoring subjects within a facility, comprising:
    a plurality of display devices located throughout a facility; and
    a data server in communication with the display devices, wherein the data server displays information about subjects within the facility via the display devices, wherein displayed subject information includes identification information for a subject and one or more coded icons adjacent to the identification information, wherein each coded icon provides information about a respective subject attribute, and wherein each coded icon is disguised such that a meaning of each coded icon is not readily apparent to an unauthorized viewer.

2. The system of claim 1, wherein subject identification information comprises a picture of the subject.

3. The system of claim 1, wherein subject attributes are selected from the group which includes medical attributes, dietary attributes, psychiatric attributes, behavior risk attributes, medication attributes, and special attributes.

4. The system of claim 1, wherein the displayed subject information for a respective subject comprises a plurality of coded icons arranged in rows and columns forming an array, wherein the array is adjacent to the identification information for the subject, and wherein each row or column of coded icons provides information about a respective different category of subject attributes.

5. The system of claim 1, wherein the displayed subject information for a respective subject comprises a plurality of coded icons arranged in rows and columns forming an array, wherein the array is adjacent to the identification information for the subject, wherein a first row or column of coded icons provides information about medical attributes of the subject, and wherein a second row or column of coded icons provides information about behavior attributes of the subject.

6. The system of claim 1, wherein the data server is configured to communicate with remotely located law enforcement agencies and determine if an arrest warrant exists for any of the plurality of subjects within the facility.

7. The system of claim 1, wherein the data server is configured to allow an authorized user to positively identify a subject in the facility via access to subject information maintained by the data server.

8. The system of claim 1, further comprising a second server located remotely from the facility, wherein the second server is in communication with the data server via a communications network, and is configured to archive subject information from the data server, and to share subject information from the data server with authorized devices remotely located from the data server.

9. A system for monitoring subjects within a facility, wherein each subject has an information tag attached thereto that contains subject identification information, the system comprising:
a plurality of display devices located throughout a facility;
a data server in communication with the display devices, wherein the data server displays information about subjects within the facility via the display devices, wherein displayed subject information includes identification information for a subject and one or more coded icons adjacent to the identification information, wherein each coded icon provides information about a respective subject attribute; and
a plurality of information tag readers in communication with the data server located throughout the facility, wherein each information tag reader is located near a respective display device, and wherein each information tag reader activates and reads subject identification information from an information tag of a subject who comes within a predetermined distance thereof.

10. The system of claim 9, wherein the data server displays subject information for identified subjects within a vicinity of a respective display device on the display device.

11. The system of claim 10, wherein the data server causes a display device to not display any subject information when a subject comes within a predetermined distance of the respective display device.

12. The system of claim 10, wherein the data server allows a user to selectively display subject information about identified subjects within a predetermined distance of a respective display device.

13. The system of claim 10, wherein the data server allows a user to selectively display subject information on a display device about subjects within the facility.

14. The system of claim 10, wherein the data server causes one or more display devices to display an alert when at least two subjects that should not be in the same vicinity of each other are within a predetermined distance of each other.

15. The system of claim 10, wherein the data server causes one or more display devices to display an alert if a subject crosses a restrictive boundary of the facility and/or enters a restricted area of the facility.

16. The system of claim 9, wherein the information tag comprises a user-activatable switch that, when activated, sends an alert signal that is read by a tag reader and then displayed on one or more of the display devices.

17. The system of claim 9, wherein the information tag attached to each subject is an RFID tag and wherein the plurality of information tag readers are RFID readers.

18. A system for monitoring subjects within a facility, wherein each subject has an information tag attached thereto that contains subject identification information, the system comprising:
a plurality of information tag readers located at a plurality of locations throughout the facility, where each reader is configured to activate and read subject identification information from information tags located in the vicinity;
a plurality of display devices, each display device located near a respective information tag reader; and
a data server operatively connected to the information tag readers and display devices, wherein the data server displays information about subjects within the facility on the display devices, wherein displayed subject information includes identification information for each subject, present location information for each subject within the facility, and one or more coded icons adjacent to the identification information, wherein each coded icon provides information about a respective subject attribute selected from the group which includes medical attributes, dietary attributes, psychiatric attributes, behavior risk attributes, medication attributes, and special attributes, and wherein each coded icon is disguised such that a meaning of each coded icon is not readily apparent to an unauthorized viewer.

19. The system of claim 18, wherein subject identification information comprises a picture of the subject.

20. The system of claim 18, wherein the information tag attached to each subject is an RFID tag and wherein the plurality of information tag readers are RFID readers.

21. The system of claim 18, wherein the displayed subject information for a respective subject comprises a plurality of coded icons arranged in rows and columns forming an array, wherein the array is adjacent to the identification information for the subject, and wherein each row or column of coded icons provides information about a respective different category of subject attributes.

22. The system of claim 18, wherein the displayed subject information for a respective subject comprises a plurality of coded icons arranged in rows and columns forming an array, wherein the array is adjacent to the identification information for the subject, wherein a first row or column of coded icons provides information about medical attributes of the subject, and wherein a second row or column of coded icons provides information about behavior attributes of the subject.

23. The system of claim 18, wherein the data server displays subject information for identified subjects within a vicinity of a respective display device on the display device.

24. The system of claim 18, wherein the data server causes a display device to not display any subject information when a subject comes within a predetermined distance of the respective display device.

25. The system of claim 18, wherein the data server allows a user to selectively display subject information about identified subjects within a predetermined distance of a respective display device.

26. The system of claim 18, wherein the data server allows a user to selectively display subject information on a display device about subjects within the facility.

27. The system of claim 18, wherein the data server causes one or more display devices to display an alert when at least two subjects that should not be in the same vicinity of each other are within a predetermined distance of each other.

28. The system of claim 18, wherein the data server causes one or more display devices to display an alert if a subject crosses a restrictive boundary of the facility and/or enters a restricted area of the facility.

29. The system of claim 18, wherein the information tag comprises a user-activatable switch that, when activated, sends an alert signal that is read by a tag reader and then displayed on one or more of the display devices.

30. The system of claim 18, wherein displayed subject information also includes one or more of the following: an indication of whether a subject is static and stabilized, an indication of whether a subject is in-transit, an indication of whether a subject is on electronic monitoring, level of security information, subject name, subject date of birth, subject allergy information, subject medication information, and subject medical device requirement information.

31. The system of claim 18, wherein the data server causes one or more of the display devices to display an alert if a subject's information tag is removed or tampered with.

32. The system of claim 18, wherein the data server is operatively connected to medical administration records for the subjects, and is configured to cross-reference displayed information for a subject with a medical administration record for the subject.

33. The system of claim 18, further comprising one or more mobile display devices, and wherein the data server displays information about the subjects on the mobile display devices, wherein the displayed information includes identification information of each subject, present location information for each subject within the facility, and one or more coded icons adjacent to the identification information, wherein each coded icon provides information about a respective subject attribute selected from the group which includes medical attributes, dietary attributes, psychiatric attributes, behavior risk attributes, medication attributes, and special attributes.

34. The system of claim 33, wherein the data server causes one or more of the mobile display devices to display an alert when either of the following occur: at least two subjects that should not be in the same vicinity of each other are within a predetermined distance of each other, when a subject's information tag is removed or tampered with.

35. The system of claim 18, wherein the data server is configured to activate the plurality of information tag readers substantially simultaneously such that a roll call of subjects within the facility can be obtained by reading subject identification information from information tags located in the vicinity of each of the information tag readers.

36. The system of claim 18, further comprising a camera located near an information tag reader that is configured to capture an image of a subject in the vicinity of the information tag reader when the information tag reader reads information from an information tag associated with the subject.

37. The system of claim 18, wherein the data server is configured to display a checklist of tasks to be performed by or on a subject via a display device in the vicinity of the subject, and wherein the data server is configured to compile reports of task checklists for subjects.

38. The system of claim 18, further comprising a second server located remotely from the facility, wherein the second server is in communication with the data server via a communications network, and is configured to archive subject information from the data server, and to share subject information from the data server with other devices remotely located from the data server.

39. The system of claim 38, wherein the second server is configured to allow authorized users to remotely log in to the data server via the second server and obtain subject information.

40. A method of monitoring subjects within a facility, comprising:
reading, via an information tag reader, subject identification information from an information tag attached to a subject located in a vicinity of the information tag reader;
displaying, via a display device located near the information tag reader, information about the subject, wherein the displayed information includes identification information for the subject, present location information for the subject within the facility, and a plurality of coded icons adjacent to the identification information, wherein each coded icon provides information about a respective subject attribute, and wherein each coded icon is disguised such that a meaning of each coded icon is not readily apparent to an unauthorized viewer.

41. The system of claim 40, wherein subject identification information comprises a picture of the subject.

42. The method of claim 40, wherein subject attributes are selected from the group which includes medical attributes, dietary attributes, psychiatric attributes, behavior risk attributes, medication attributes, and special attributes.

43. The method of claim 40, wherein the plurality of coded icons comprises a plurality of coded icons arranged in rows and columns forming an array, wherein the array is adjacent to the identification information for the subject, and wherein each row or column of coded icons provides information about a respective different category of subject attributes.

44. The method of claim 40, further comprising blanking the display device when the subject comes within a predetermined distance of the display device.

45. The method of claim 40, further comprising displaying an alert on the display device when another subject that should not be in the vicinity of the subject is within a predetermined distance of the subject.

46. The method of claim 40, further comprising displaying an alert on the display device when the subject is in an unauthorized location.

47. The method of claim 40, further comprising displaying an alert on the display device in response to detecting that the subject's information tag has been removed or tampered with.

48. The method of claim 40, wherein displayed subject information also includes one or more of the following: an indication of whether a subject is static and stabilized, an indication of whether a subject is in-transit, an indication of whether a subject is on electronic monitoring, level of security information, subject name, subject date of birth, subject allergy information, subject medication information, and subject medical device requirement information.

49. An article of manufacture for monitoring subjects within a facility, wherein each subject has an information tag attached thereto that contains subject identification information, comprising a computer readable storage medium having encoded thereon instructions that, when executed on a computer, cause the computer to:

read, via an information tag reader, subject identification information from an information tag attached to a subject located in a vicinity of the information tag reader;

display, via a display device located near the information tag reader, information about the subject, wherein the displayed information includes identification information for the subject, present location information for the subject within the facility, and a plurality of coded icons adjacent to the identification information, wherein each coded icon provides information about a respective subject attribute, and wherein each coded icon is disguised such that a meaning of each coded icon is not readily apparent to an unauthorized viewer.

50. The article of manufacture of claim 49, wherein the computer readable storage medium has encoded thereon instructions that, when executed on a computer, causes the computer to display the plurality of coded icons in rows and columns forming an array, wherein the array is adjacent to the identification information for the subject, and wherein each row or column of coded icons provides information about a respective different category of subject attributes.

51. The article of manufacture of claim 49, wherein the computer readable storage medium has encoded thereon instructions that, when executed on a computer, causes the computer to blank the display device when the subject comes within a predetermined distance of the display device.

52. The article of manufacture of claim 49, wherein the computer readable storage medium has encoded thereon instructions that, when executed on a computer, causes the computer to display an alert on the display device when another subject that should not be in the vicinity of the subject is within a predetermined distance of the subject.

53. The article of manufacture of claim 49, wherein the computer readable storage medium has encoded thereon instructions that, when executed on a computer, causes the computer to display an alert on the display device when the subject is in an unauthorized location.

54. The article of manufacture of claim 49, wherein the computer readable storage medium has encoded thereon instructions that, when executed on a computer, causes the computer to display an alert on the display device in response to detecting that the subject's information tag has been removed or tampered with.

\* \* \* \* \*